(12) United States Patent
Fujita et al.

(10) Patent No.: US 6,193,775 B1
(45) Date of Patent: Feb. 27, 2001

(54) COATED GRANULAR FERTILIZER

(75) Inventors: Toshio Fujita, Fukuokaken; Shigemitsu Yoshida, Kumamotoken, both of (JP)

(73) Assignee: Chisso Corporation, Tokyo (JP)

( * ) Notice: Subject to any disclaimer, the term of this patent is extended or adjusted under 35 U.S.C. 154(b) by 0 days.

(21) Appl. No.: 08/102,829

(22) Filed: Aug. 6, 1993

(30) Foreign Application Priority Data

Aug. 13, 1992 (JP) .................................... 4-237651

(51) Int. Cl.⁷ .................................... C05G 5/00
(52) U.S. Cl. ................ 71/27; 71/64.07; 71/64.11
(58) Field of Search ............... 71/11, 27, 64.07, 71/64.11, 64.13, 25, 26, 903

(56) References Cited

U.S. PATENT DOCUMENTS

| | | | |
|---|---|---|---|
| 3,400,011 | * | 9/1968 | Fox ...................................... 71/64.11 |
| 4,277,364 | * | 7/1981 | Shasha et al. ...................... 71/64.11 |
| 4,793,474 | * | 12/1988 | Drake ................................. 71/64.11 |
| 4,810,280 | * | 3/1989 | Le Van Mao et al. .................. 71/62 |
| 4,880,455 | * | 11/1989 | Blank ................................. 71/64.11 |
| 4,881,963 | * | 11/1989 | Fujita et al. ....................... 71/64.07 |
| 4,911,952 | * | 3/1990 | Doane et al. ........................ 71/64.11 |
| 4,995,897 | * | 2/1991 | Schramm et al. .................... 71/64.11 |
| 5,133,797 | * | 7/1992 | Mahara et al. ...................... 71/64.11 |
| 5,147,442 | * | 9/1992 | Kosuge et al. ..................... 971/64.07 |
| 5,186,732 | * | 2/1993 | Thompson et al. ................. 71/64.11 |
| 5,273,760 | * | 12/1993 | Oshlack et al. ....................... 424/480 |
| 5,371,194 | * | 12/1994 | Ferretti ............................... 71/64.11 |

FOREIGN PATENT DOCUMENTS

| | | | |
|---|---|---|---|
| 3221737 | * | 12/1983 | (DE) ................................... 71/64.11 |
| 0276179 | * | 7/1988 | (EP) ................................... 71/64.11 |
| 49-18659 | | 2/1974 | (JP) . |
| 63-25288 | | 2/1988 | (JP) . |
| 3-60486 | | 3/1991 | (JP) . |

* cited by examiner

*Primary Examiner*—Wayne Langel
(74) *Attorney, Agent, or Firm*—McDermott, Will & Emery

(57) ABSTRACT

A coated granular fertilizer which makes it possible to independently design the period since its application till 10% dissolution-out and the period since 10% dissolution-out till completion of its dissolution-out is provided, which fertilizer is prepared by coating a granular fertilizer with a coating having a sugar polymer or its derivative dispersed therein, and has a time limit dissolution-out function, the former period till 10% dissolution-out and the latter dissolution-out duration being respectively capable of being controlled to within a range of 26 to 315 days and a range of 29 to 371 days.

15 Claims, 3 Drawing Sheets

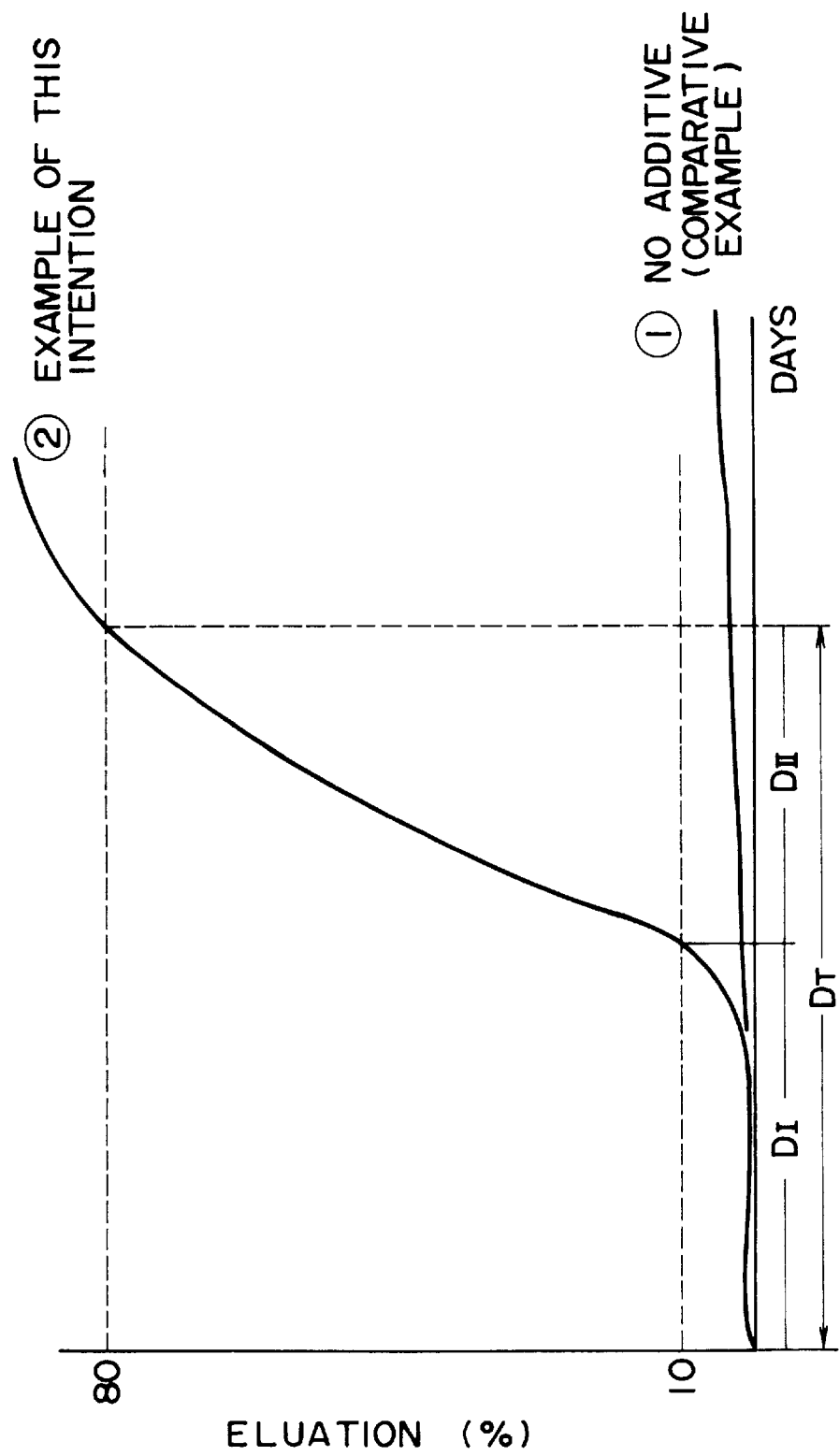

COATED GRANULAR FERTILIZER

BACKGROUND OF THE INVENTION

1. Field of the Invention

This invention relates to a coated fertilizer capable of controlling its dissolution-out velocity. More particularly, it relates to a coated fertilizer which begins to dissolve out after lapse of a definite period after its application to exhibit its fertilizing effect.

The product of the present invention is obtained by coating a granular fertilizer with a coating having a powder of a sugar polymer or its derivative dispersed therein.

2. Description of the Related Art

In recent years, a coated granular fertilizer having a granular fertilizer capsulated to control the dissolution-out velocity of its fertilizing effect component has been developed and gradually practically used. Such a coating process for the coated granular fertilizer is roughly classified into the following two kinds: ① a relatively thick coating is carried out using a coating material such as sulfur, wax, a low molecular weight polymer such as a low molecular polyolefin, etc. and ② a relatively thin coating is carried out using a high molecular weight material such as polyolefin, etc.

However, as to such coated granular fertilizers, the product obtained by coating with the latter, high molecular weight material, is superior in that the controllability of the dissolution-out velocity is higher, the damage of the coating at the time of handling the granular fertilizer is smaller, etc. On the other hand, however, the product (coated granular fertilizer) has the drawbacks that the coating process with the high molecular weight material is technically not easy; a relatively long time is required for decomposing the coating residue remaining in soil after its application; etc.

The present inventors previously have developed techniques of coating granular fertilizers with a high molecular weight material and controlling the dissolution-out velocity of a component having a fertilizing effect, and have applied for patents. For example, we have disclosed a coating technique with a polyolefin resin solution (Japanese patent publication No. Sho 50-99,858) and a high level technique of controlling the dissolution-out velocity by the simultaneous use of a polyolefin resin, an ethylene-vinyl acetate copolymer and a surfactant (Japanese patent publication No. Sho 60-37,074).

Further, we have disclosed a technique that by using a product obtained by further mixing and dispersing powder of a mineral material such as talc, etc. or sulfur in a polyolefin resin composition as described above, not only the dissolution-out velocity of a component having a fertilizing effect can be controlled, but also collapse or decomposition of the remaining capsule i.e. a coating residue after use of the granular fertilizer (its application onto soil) can be promoted (Japanese patent publication No. Sho 60-3,040 and Japanese patent application laid-open No. Sho 55-1,672).

These techniques for controlling the dissolution-out refer basically to a technique for controlling the dissolution-out period, and in other words, refer to a technique for controlling the dissolution-out velocity, expressing the quantity dissolved out per period or per hour. According to these techniques, a commodity optionally affording a desired fertilizing effect over a short or long period has been provided, and an evolutional agricultural technique of cultivation with totally a basal fertilizer, etc. has been established.

However, in order to improve these techniques to a technique on a higher level, a fertilizer of such a type that a desired dissolution-out begins after lapse of a definite period, has been desired. (Problem to Be Solved by the Invention)

The present inventors have made extensive research in order to make the above-mentioned technique of optionally controlling the dissolution-out velocity, disclosed by the present inventors, correspond to a new technique on a higher level, of dissolution-out after lapse of a definite period after its application, which technique has been earnestly desired by farmers and agricultural engineers, that is, a technique of the so-called time limit dissolution-out control type. As a result, we have found that when a sugar polymer or its derivative is dispersed in the coating of fertilizer, it is possible to control the induction period before start of dissolution-out and the duration of dissolution-out after start of dissolution-out, and we have completed the present invention.

As apparent from the foregoing, the object of the present invention is to provide a fertilizer which can optionally and independently control the dissolution-out-induction period since its application until the start of dissolution-out and the dissolution-out period since the start of dissolution-out till completion of dissolution-out.

Further, according to the present invention, it is also possible to provide a fertilizer whose capsule decomposes or collapses after completion of dissolution-out, bY choosing a known coating material having a decomposition or collapse function.

SUMMARY OF THE INVENTION

The present invention has the following features (1) to (12):

(1) A coated granular fertilizer coated by a coating having at least one kind selected from powder composed mainly of a sugar polymer or its derivative dispersed in a resin, and having a time limit dissolution-out function.

(2) A coated granular fertilizer having a time limit dissolution-out function according to item (1), wherein said powder composed mainly of a sugar polymer or its derivative is at least one kind selected from the group consisting of grain flour, cellulose powder, powder of chitin, chitosan or derivative thereof, agar powder, alginic acid powder, starch and its derivative.

(3) A coated granular fertilizer having a time limit dissolution-out function according to item (2), wherein said grain flour is at least one member selected from the group consisting of rice flour, wheat flour, barley flour, oats flour and cornflour.

(4) A coated granular fertilizer having a time limit dissolution-out function according to item (2), wherein said cellulose derivative is at least one member selected from the group consisting of methyl cellulose, ethyl cellulose, carboxymethyl cellulose and carboxyethyl cellulose.

(5) A coated granular fertilizer having a time limit dissolution--out function according to item (2), wherein said starch derivative is at least one member selected from the group consisting of oxidized starch, fatty acid ester starch, alkyl ether starch, hydroxyalkyl ether starch and mineral acid ester starch.

(6) A coated granular fertilizer having a time limit dissolution-out function according to item (1), wherein said powder composed mainly of a sugar polymer or its derivative has a particle diameter of 0.1 to 100 $\mu$m.

(7) A coated granular fertilizer having a time limit dissolution-out function according to item (1), wherein said powder composed mainly of a sugar polymer or its derivative is dispersed in a resin in a quantity of 0.5 to 20% by weight based upon the weight of the resin.

(8) A coated granular fertilizer having a time limit dissolution-out function according to item (1), wherein said powder composed mainly of a sugar polymer or its derivative is dispersed in a resin coating comprising as an active ingredient, at least one member selected from the group consisting of olefin polymer, olefin copolymer, vinylidene chloride polymer, and copolymer of vinylidene chloride.

(9) A coated granular fertilizer having a time limit dissolution-out function according to item (8), wherein the resin constituting said resin coating is at least one member selected from the group consisting of olefin polymer, olefin copolymer, vinylidene chloride polymer, vinylidene chloride copolymer of vinylidene chloride with at least one member selected from the group consisting of ethylene, propylene and butene, and at least one member selected from the group consisting of ethylene-CO copolymer, ethylenevinyl ketone copolymer, vinylidene chloride-vinyl chloride copolymer and vinylidene-acrylate copolymer.

(10) A coated granular fertilizer having a time limit dissolution-out function according to item (1), wherein said powder composed mainly of a sugar polymer or its derivative is dispersed in a resin containing a mineral filler.

(11) A coated granular fertilizer having a time limit dissolution-out function according to item (10), wherein said mineral filler is at least one member selected from the group consisting of powder of talc, sulfur, $CaCO_3$, silica, zeolite, diatomaceous earth, clay and metal oxides.

(12) A coated granular fertilizer having a time limit dissolution-out function according to item (10), wherein the content of said mineral filler is 20 to 70 weight % upon the weight of said resin.

BRIEF DESCRIPTION OF THE DRAWINGS

FIG. 4 shows a view illustrating the measurement methods of the dissolution-out induction period ($D_1$) and the dissolution-out period ($D_2$)

DETAILED DESCRIPTION OF PREFERRED EMBODIMENTS

Figure 1:
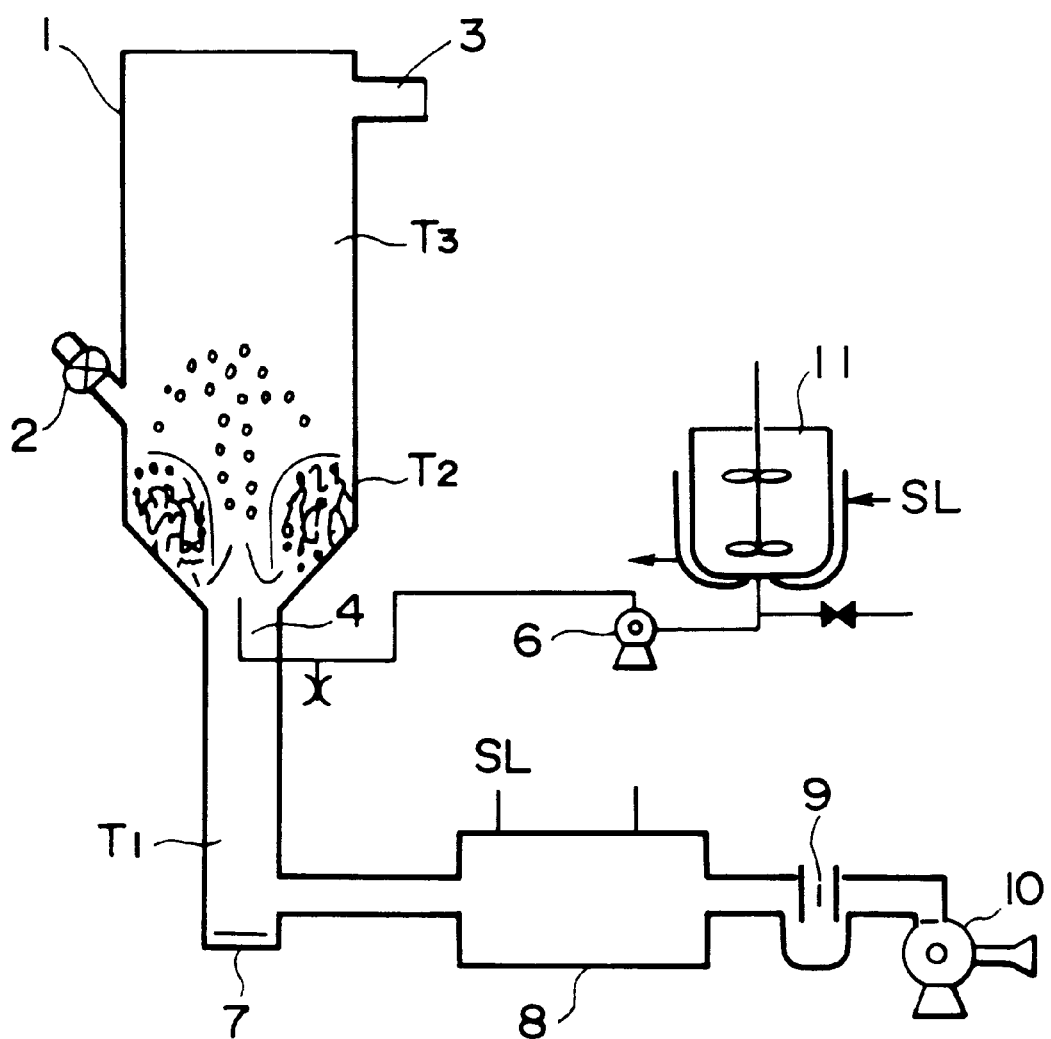
FIGS. 1 and 2 each illustrate a flow sheet of a jet-coating apparatus employed in the Examples.

The constitution and effectiveness of the present invention will be described below in more detail.

In the present invention, in order to retain the time limit dissolution-out function by adding the above-described sugar polymer or its derivative, a coating technique of suppressing the dissolution-out of the fertilizer at least until the start of the dissolution-out is necessary for achieving the present invention. Namely, in order to effectively make use of the product of the present invention, a coating technique of suppressing the dissolution-out over a long period is necessary. Such a technique refers to a technique capable of completely coating a fertilizer with a coating having a low moisture vapor permeability, and as a general-purpose coating material having a low moisture vapor permeability, an olefin polymer or copolymer and vinylidene polymer or copolymer can be recommended.

The present invention has requirements of the above-described excellent coating technique, choice of a material having a low moisture vapor permeability and further, acquisition of a necessary and sufficient coating thickness.

The thickness of the coating capable of creating the dissolution-out function of the coated fertilizer is not alike, depending upon the conditions of coating material, coating process, denseness of coating, etc., and what extent of the thickness is necessary is not unilaterally determined, but when the present invention is carried out, it is preferred to set the thickness to about 1.2 to 2.6 times, preferably about 1.5 to 2.0 times the thickness conventionally employed.

By using a material having a high uniformity and a low moisture vapor permeability and increasing the thickness of the coating, the dissolution-out is certainly suppressed to afford coated particles constituting the basis of the present invention. Further, if the coating thickness is too large, a coating material exceeding its necessary quantity is required; hence this is not economical.

According to the present invention, a sugar polymer or its derivative is dispersed in such a difficultly dissolving-out coating, and at that time, the induction period (hereinafter referred to as $D_1$) since after use of the resulting material until 10% dissolution-out, and the dissolution-out period (hereinafter referred to as $D_2$) since 10% dissolution-out till the duration of the dissolution-out are separately controlled, depending upon its kind, addition quantity, etc., and the total period as a result is regarded as the total dissolution-out period (hereinafter referred to as $(D_1 + D_2 = D_T)$.

As the influential factors upon the $D_1$ and $D_2$ to be controlled in the present invention, a plurality of factors are enumerated, and $D_1$ and $D_2$ are each obtained from the composite results of these factors, and not unilaterally determined, but usually the following factors should be specified:

the kind, particle form and shape of the fertilizer, the kind, composition and thickness of the coating material, and the kind and addition quantity of the indispensable sugar polymer or its derivative.

In general, as to the fertilizer to be used, the kind and the particle form of the fertilizer are often specified in advance and hence the width of its choice is not so large; thus the kind and composition of the coating material and the sugar polymer or its derivative are chosen and combined so as to accord with the fertilizer, to thereby separately control $D_1$ and $D_2$.

When the sugar polymer or its derivative used in the present invention is dispersed in the coating of the coated fertilizer having its dissolution-out suppressed, dissolution-out characterized by the corresponding $D_1$ and $D_2$ is exhibited. In this case, when the quantity of the sugar polymer or its derivative increases (or decreases), $D_1$ and $D_2$ both become small (or large), and this has a large influence particularly upon $D_2$.

To the contrary, when the addition quantity is kept constant and the coating material and its composition are varied, $D_1$ and $D_2$ are also both influenced and vary, and in this case, to the contrary, the variation of $D_1$ is large, while that of $D_2$ is small. As described above, in the present invention, by adequately selecting the coating and the quantity of the additive, it is possible to obtain desired $D_1$ and $D_2$; thus the effectiveness and usefulness of the present invention are notably enhanced.

Namely, if it is desired to increase the ratio of $D_1/D_2$, when a coating material having a moisture vapor permeability as low as possible is used and a sugar polymer or its derivative as the additive is added in a large quantity to promote the dissolution-out, the object can be achieved. To the contrary, if it is desired to maintain $D_T$ and make the ratio of $D_1/D_2$ small, when the quantity of the additive is decreased and a material having a relatively high permeability is chosen or the quantity of the blend or filler is increased, to thereby keep the whole $D_T$ constant, then the object can be achieved.

The sugar polymer as a main component of the indispensable additives of the present invention refers to polymers consisting of at least one kind of hexoses such as glucose, fructose, etc. or their derivatives, pentoses such as xylose, arabinose, ribose, etc. or their derivatives, for example, polysaccharides such as cellulose, agar, starch, etc. and chitin or its derivatives, chitosan or its derivatives, and grain flour is a cheap and desirable material.

As the grain flour, flours such as wheat flour, barley flour, oats flour, etc., rice flour, buckwheat flour, cornflour, Setaria flour, Echinochloa flour, etc. are mentioned, and any one of them are usable in the present invention. As to these flours, materials of Tyler 100 mesh pass, preferably 200 mesh pass, are preferred to use. When larger powder is dispersed in the coating, it forms a discontinuous phase in the coating; hence it is impossible to maintain a function as a barrier and a function of controlling the dissolution-out is damaged.

Grain flour is usually composed mainly of starch which is glucose polymer, and protein, ashes, raw fatty matter, etc. are contained therein, but it has been found that such protein, ashes and raw fatty matter are not always indispensable elements for the present invention.

Thus, it has been found that even starch having these components removed, makes it possible to control $D_1$, $D_2$ and $D_T$ if the material and composition of the coating are selected and the quantity of starch is carefully combined therewith; thus the above starch is effectively usable for the present invention. In this case, it has also been confirmed that besides the starch refined from grain, substerranean stem starch such as those of potato or the like are also effective.

It has also been found that processed starch such as oxidized starch, a-starch, inorganic acid or fatty acid ester starch, alkyl or hydroxylalkyl ether starch, etc. or starch derivatives are also usable in the present invention. However, among starch derivatives, substitutes of 1.5 mol or less corresponding to 50% of OH group are effective, and as to those having a high proportion of esterification or etherification, the effectiveness lowers correspondingly to the proportion.

Examples of ester type or ether type starch are acetic acid starch, phosphoric acid starch, nitric acid starch, succinic acid starch, xanthogenic acid starch, etc. in the case of ester type, and carboxymethylated starch, methylated starch, hydroxyalkylated starch, allylether starch, cationic starch, etc. in the case of ether type starch. However, the above type starch is not limited thereto.

Further, in the present invention, even in the case where a cellulose having a different bonding manner from that of cellulose or its derivative is coated, the object can be achieved. As to cellulose, a product obtained by subjecting raw cellulose to acid hydrolysis treatment and mechanical treatment into finely divided powder, or a processed cellulose obtained by converting a cellulose derivative into finely divided, spherical type powder, followed by subjecting the powder to hydrolysis treatment are usable.

As the cellulose derivatives, carboxymethylcellulose, hydroxyethylcellulose, hydroxypropylcellulose, methyl cellulose and carboxymethylethylcellulose are effective, and the carboxylic acid group is preferred to be of an acid type, not of a basic type, and further, the alkyl ether type is preferred to have a degree of substitution of 65% or less.

In the present invention, other sugar polymers such as agar powder, alginic acid powder, chitin and chitosan, derivatives thereof, etc. are used as superior additive. These additives of the present invention are preferred to be a material of Tyler 100 mesh pass, preferably 200 meshes pass, as in the case of grain flour.

The quantity of these additives added should be checked and chosen, together taking into account, a coated material and composition matching the fertilizer to be processed, in order to obtain the desired $D_1$ and $D_2$ as described above; hence the quantity should not be specified. However, in the case of fertilizers having a high deliquescence and a high solubility such as urea, ammonium nitrate, etc., a quantity of about 0.5 to 20 weight % is practically effective.

It is very important for these additives to disperse them in the coating uniformly as soon as possible and so as not to agglomerate therein. Thus, in the case where the additives are fed so as to be dispersed in a coating solution or the like, it is necessary to always sufficiently disperse them with in tense stirring e.g. in a coating solution bath, and it is also necessary to pay attention lest the coating solution should stagnate in the piping or at the pump part to cause its agglomeration.

If the additives are deviationally distributed in the coating in an agglomerated state, the uniformity of the coating is lost, and as a result, the dissolution-out velocity exceeds the calculated value. As to the state, by observing the rupture cross-section of the capsule i.e. the coated granular fertilizer by means of an electron microscope, it is possible to well grasp the dispersed state of the additives. In order to retain the hydrophilicity on the surface, for example, silicone coat or the like is effective for improving the dispersion, but it is possible to disperse the additives by means of intense agitation, as described above; hence the silicone coat treatment is not an indispensable requirement for the present invention.

A further important point in the present invention consists in that the additives of the present invention is in a dried state inside the capsule. This does not always mean to be anhydrous, and although it is necessary in principle to dry and use them when they are applied to coating, this is not always necessary if such conditions that the dried state is effected during coating, are established.

For example, in the case where the additives are dispersed in the coating solution, water vaporizes and as a result, they may be fed under dried condition, and in the case where they are transferred in dispersed state in hot air, followed by adhering to the coating, necessary drying may be carried out during flying in the hot air.

Further, it is necessary to sufficiently dry the product of the present invention after its production and take care so that moisture absorption may not proceed notably during its storage. Namely, it is necessary for the product of the present invention to place it in a resin bag in sealed state, as in the case of general hygroscopic fertilizers. If such a storage treatment is insufficient, particularly Di (induction period before the start of dissolution-out) changes with lapse of time, and as a result, there is a fear that the effectiveness of the present invention is lost. Such a hygroscopic function of the sugar polymer is presumed to have a certain relationship with exhibition of the effectiveness of the product of the present invention at the time of its use, but the function mechanism is unclear.

When the product of the present invention is applied to practical farm, it is possible to establish dissolution-out of a desired pattern at an optional time. Thus, when it is combined with a general rapid-release fertilizer or a conventional slow-release fertilizer, it is theoretically possible to establish dissolution-out of any component of fertilizing effect in advance of its application. Accordingly, labor-saving at the time of fertilizer application is notably promoted, and it is possible to establish dissolution-out accorded with absorption of component of fertilizing effect by crops; hence there is no loss of fertilizer, and as a result, resources-saving is effected and flow-away of fertilizer to the environment outside the farm is suppressed to a minimum.

Since the product of the present invention is of a shape wherein the surface of granular fertilizer is coated, the applied fertilizer is of a granular product, but its kind is not limited. Namely, the fertilizer includes known chemical fertilizers such as straight fertilizers e.g. ammonium sulfate, ammonium chloride, urea, potassium chloride, potassium nitrate, sodium nitrate, ammonium phosphate, potassium phosphate, calcium phosphate, etc. and compound fertilizers consisting of two kinds or more of the above straight fertilizers.

The process for producing a coated granular fertilizer of the present invention i.e. a process for coating a granular fertilizer is not particularly limited, but for example, it is possible to carry out the process in a similar manner to that of the known process invented by the present inventors (Japanese patent publication Nos. Sho 50-99,858 and Sho 60-37,074).

According to the process, an organic solvent solution of the above-mentioned coating material composition is blown onto a granular fertilizer in rolled or fluidized state by means of spray or the like to coat the surface, while the resulting coated material is simultaneously and in parallel treated with a high speed hot gas current to instantaneously vaporize the organic solvent on the surface of the caoted material and dry the surface. For the fluidization of the granular fertilizer in this case, it is most preferred to carry out it using a jet layer.

In the coating process, in order to uniformly disperse the sugar polymer of the present invention, it is particularly necessary to take into consideration that the coating solution in a vessel is vigorously agitated so as not to agglomerate the solution. Further, it is also feasible to disperse the powder of the sugar polymer as follows:

In this case, a known process disclosed by the present inventors (Japanese patent publication No. Sho 60-102) may be also employed, wherein a portion or the total of the powder in the coating material is mixed with a hot air for jet and dispersed therein to carry out the above-mentioned coating operation to thereby disperse the powder in the coating to be formed on the surface of the granular fertilizer.

The above process is suitable to the case where a powder which is difficult to be uniformly dispersed in an organic solvent solution of the above coating material composition is used.

The present invention will be described in more detail by Examples.

Example

I. Production example 1 of the fertilizer of the present invention

FIG. 1 illustrates a jet-capsulation apparatus employed in the present Example. Numeral 1 shows a jet column having a column diameter of 250 mm, a height of 200 mm, an air jet diameter of 50 mm, a cone angle of 50°, a fertilizer-feeding port 2 and a discharge exit 3. An jet port air is sent from a blower 10, and reaches the jet column via an orifice flowmeter 9 and a heat exchanger 8. The flow quantity is controlled by a flow meter and the temperature is controlled by a heat-exchanger. The exhaust gas is discharged from an exhaust gas exhit 3 to the outside of the column.

The granular fertilizer to be used in the capsulation treatment is fed from the fertilzier-feeding port while passing a hot gas ($N_2$ gas) to form a jet. The hot gas temperature, the granule temperature during the capsulation and the discharge temperature are respectively detected by thermometers $T_1$, $T_2$ and $T_3$. When $T_2$ reached a definite temperature, the capsulating fluid is blown through a single-fluid nozzle in the form of spray toward the jet.

The capsulating fluid is agitated in a liquid tank 11, and in the case of using the powder, the powder has been uniformly dispersed, and the fluid is sent by pump 6 from the tank. The pipe from the tank to the nozzle is doubled so that the temperature therebetween may not lower down to 100° C. a lower and steam is flown into the outer space of the double tube. When the capsulation percentage reached a definite vlaue, the blower is stopped and the capsulated fertilizer is discharged from discharge port 7.

In any of the present Examples, capsulation was carried out, while maintaining the following fundamental conditions:

Single-fluid nozzle: opening, 0.8 mm, full cone type
Quantity of hot gas: 4 $m^3$/min.
Temperature of hot gas: 100° C. ±2° C.
Kind of fertilizer: 6–7 mesh granular urea
Quantity of fertilizer fed: 10 Kg
Concentration of capsulating fluid: solids, 2.5% (Solvent used: toluene) by weight
Quantity of capsulating fluid fed: 0.5 Kg/min.
Capsulation time: 80 min.
Capsulation percentage (based upon fertilizer): 10%

II. Production example 2 of the fertilizer of the present invention

Figure 2:
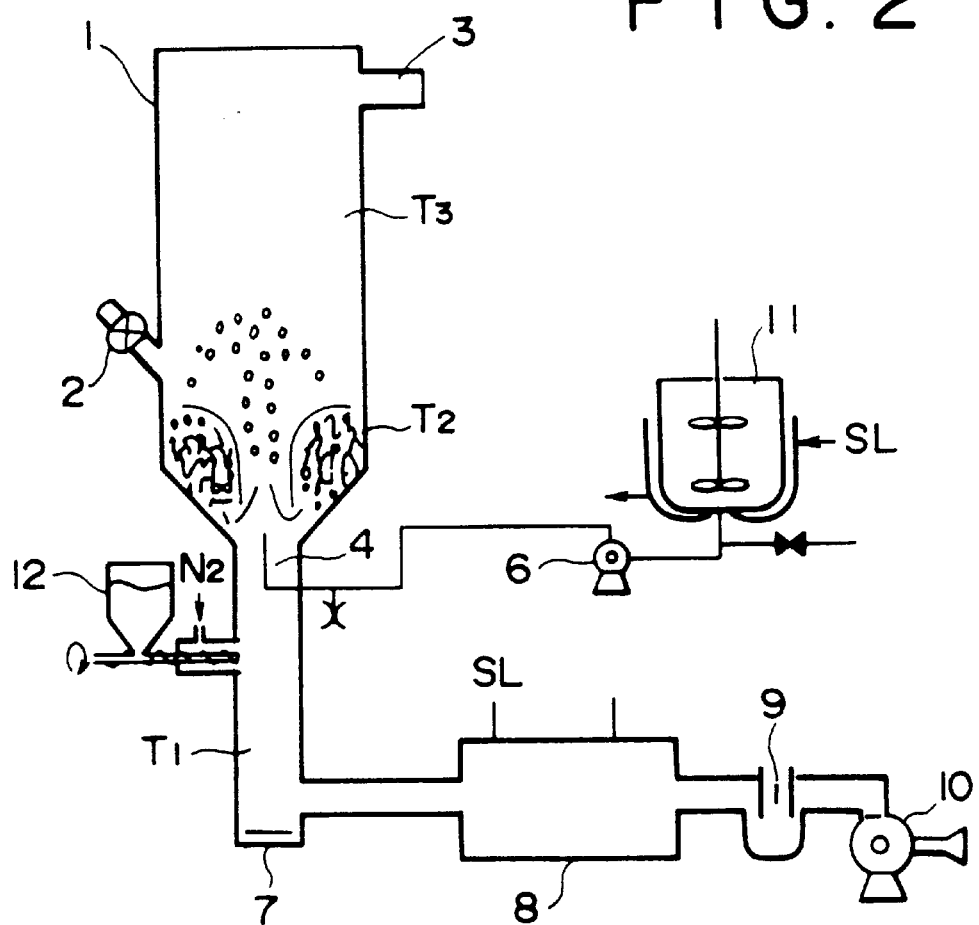

FIG. 2 illustrates a jet-capsulation apparatus employed in the present Example. In FIG. 2, a microfeeder 12 for feeding a powder in a slightest quantity is provided at the inlet part of hot gas below the lower part of the jet column.

The difference between the production example 1 and the production example 2 consists in that when the powder composed mainly of the sugar polymer or its derivative as a necessary constituting element for the present invention is dispersed in the coating, production example 1 is carried out by dispersing the powder in the coating solution, whereas production example 2 is carried out by dispersing the powder in a hot gas for jet for vaporizing off the solvent and simultaneously feeding the dispersion together with the coating solution not containing the powder to thereby cause them to adhere onto the surface of the jetted granular fertilizer, and as a result, disperse the powder in the coating like the case of production example 1.

Figure 3:
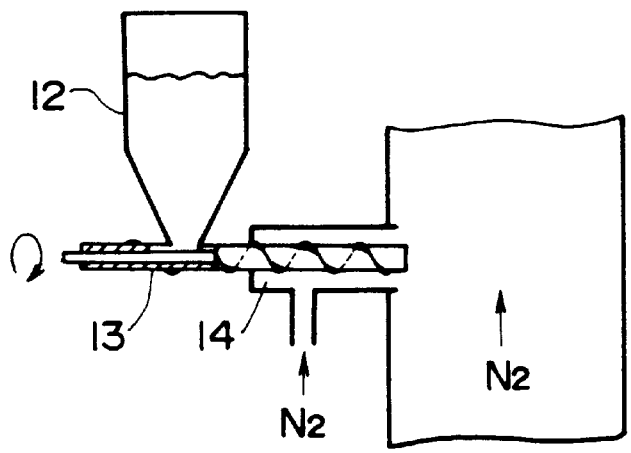
FIG. 3 illustrates a partly enlarged view of the flow sheet of FIG. 2.

FIG. 3 shows an enlarged figure of the part where the microfeeder is provided, of FIG. 2. Numeral 13 refers to a miniscrew feeder of teflon (made by us) having a cylinder diameter of 0.8 cm and as to the revolution of the screw part, the number of revolution is designed so as to be controlled in the range of 1 to 60 rpm. The joint part 14 of the miniscrew feeder to the hot gas-introducing pipe part (hereinafter abbreviated to main pipe) is constructed so as to form a double structure, and $N_2$ gas (at room temperature) is jetted from the tip end part of the joint part into the main pipe to help dispersing of the powder in the main hot gas.

The feed of the powder is interlocked with the feed of the coating solution so that both the feeds may be simultaneously carried out. Thus, while the coating solution is fed, the sample powder is fed uniformly and in a small by small quantity. Other coating operations are the same as those of production example 1.

In this Example, capsulation was carried out while retaining the following fundamental conditions:

Single-fluid nozzle: opening, 0.8 mm full cone type
Quantity of hot gas: 4 m$^3$/min.
Temperature of hot gas: 100° C. ±2° C.
Kind of fertilizer: 6–7 mesh granular urea
Quantity of fertilizer fed: 10 Kg
Concentration of capsulating fluid fed: solids, 2.5% (solvent used: toluene) by weight
Quantity of capsulating fluid fed: 0.5 Kg/min.
Capsulation time: 80 min.
Capsulation percentage (based upon fertilizer): 10%
Time of powder feed by means of microfeeder: 80 min.
Velocity of N$_2$ fed at the part of microfeeder: 0.2 l/min.

III. Measurement methods of the dissolution-out induction period ($D_1$) and the dissolution-out period ($D_2$) of the fertilizer of the present invention:

Each 10 g of the respective fertilizers produced in production examples 1 and 2 is immersed in water (200 ml) and allowed to stand still at 25° C. After a definite period, the fertilizer is separated from water and the quantity of urea dissolved out into water is sought according to quantitative analysis.

A fresh water (200 ml) is added to the fertilizer, followed by allowing the mixture to stand still at 25° C. and carrying out the same analysis after a given period. Such operation is repeated and the relationship between the cumulative total of the percentage of urea dissolved out into water and the number of days are graphed to prepare a dissolution-out speed curve (FIG. 4), and $D_1$ and $D_2$ are sought according to the following gist:

In order to evidence that it is possible to control the induction period ($D_1$) since after the use of the coated fertilizer of the present invention till 10% dissolution-out and the dissolution-out period ($D_2$) since the start of dissolution-out till the duration of the dissolution-out, samples of Examples and Comparative examples were prepared for trial in production examples 1 and 2. The results are shown in Tables 1 to 4.

TABLE 1

| | Coating composition (wt %) | | | | | | | | | |
|---|---|---|---|---|---|---|---|---|---|---|
| | Resin A | | Resin B | | Filler | | Adjusting agent for time limit dissolution-out | | DI | DII | Production |
| No. | Name of material | % | Name of material | % | Name of material | % | Name of material | % | (No. of days) | (No. of days) | Process |
| Compar. ex. 1 | *$^{-1}$ECO | 50 | — | — | *$^{-2}$Talc | 50 | *$^{-3}$Wheat flour | 0 | 106 | 500 or longer | 1 |
| Example 1 | " | " | — | — | " | 48 | " | 2 | 75 | 196 | " |
| Example 2 | " | " | — | — | " | 46 | " | 4 | 64 | 119 | " |
| Example 3 | " | " | — | — | " | 44 | " | 6 | 59 | 89 | " |
| Example 4 | " | " | — | — | " | 42 | " | 8 | 54 | 56 | " |
| Example 5 | " | " | — | — | " | 40 | " | 10 | 52 | 36 | " |
| Example 6 | " | 60 | — | — | " | 34 | " | 6 | 89 | 126 | " |
| Example 7 | " | 50 | — | — | " | 44 | " | 6 | 59 | 89 | " |
| Example 8 | " | 40 | — | — | " | 54 | " | 6 | 38 | 64 | " |
| Example 9 | " | 30 | — | — | " | 66 | " | 6 | 18 | 38 | " |
| Example 10 | " | 45 | *$^{-4}$EVA | 5 | " | 44 | " | 6 | 47 | 62 | " |
| Example 11 | " | 40 | " | 10 | " | 44 | " | 6 | 26 | 56 | " |

*1: C$_2$H$_4$—CO copolymer, CO: 1.0 wt. %, MI: 0.9
*2: Average particle diameter 5μ
*3: Soft flour, 200 mesh pass
*4: C$_2$H$_4$-vinyl acetate copolymer, VAc 10 wt. %

TABLE 2

| | Coating composition (wt %) | | | | | | | | | |
|---|---|---|---|---|---|---|---|---|---|---|
| | Resin A | | Resin B | | Filler | | Adjusting agent for time limit dissolution-out | | DI | DII | Production |
| No. | Name of material | % | Name of material | % | Name of material | % | Name of material | % | (No. of days) | (No. of days) | Process |
| Compar. ex. 2 | *$^{-5}$PVdCL | 55 | — | — | Talc | 45 | *$^{-6}$Starch | 0 | 250 | 800 or longer | 1 |
| Example 12 | " | " | — | — | " | 39 | " | 6 | 148 | 125 | " |
| Example 13 | " | " | — | — | " | 37 | " | 8 | 141 | 69 | " |
| Example 14 | " | " | — | — | " | 31 | " | 14 | 132 | 48 | " |
| Example 15 | " | " | — | — | " | 27 | " | 18 | 126 | 30 | " |
| Compar. ex. 3 | *$^{-7}$PE | 45 | *$^{-8}$Paraffin wax | 5 | " | 50 | — | — | 98 | 500 or longer | " |
| Example 16 | " | " | *$^{-8}$Paraffin wax | " | " | 44 | *$^{-9}$Agar powder | 6 | 59 | 81 | " |
| Example 17 | " | " | *$^{-8}$Paraffin wax | " | " | " | *$^{-10}$Alginic acid PG | 6 | 42 | 47 | " |

TABLE 2-continued

| | Coating composition (wt %) | | | | | | | | | |
|---|---|---|---|---|---|---|---|---|---|---|
| | Resin A | | Resin B | | Filler | | Adjusting agent for time limit dissolution-out | | DI | DII | Produc- |
| No. | Name of material | % | Name of material | % | Name of material | % | Name of material | % | (No. of days) | (No. of days) | tion Process |
| Example 18 | " | " | *-8Paraffin wax | " | " | " | *-11Cellulose | 6 | 48 | 60 | " |
| Example 19 | " | " | *-8Paraffin wax | " | " | " | *-12Methyl* cellulose | 6 | 62 | 83 | " |
| Example 20 | " | " | *-8Paraffin wax | " | " | " | *-13CMC | 6 | 44 | 53 | " |
| Example 21 | " | " | *-8Paraffin wax | " | " | " | *-14Oxidized ester starch | 6 | 53 | 67 | " |

*-5Vinylidene chloride-vinyl chloride copolymer, VCl: 10 wt. %
*-6Cornstarch
*-7Low density polyethylene, MI: 7.0
*-8The Japanese Pharmocopoeia, m.p. 68–70° C.
*-9Reagent grade, milled, 200 mesh pass
*-10Reagent grade, milled, 200 mesh pass
*-11Cellulose powder, milled, 200 mesh pass
*-12The Japanese Pharmocopoeia, methoxy content 29 wt. % product, powder milled, 200 mesh pass
*-13Powder for chromatography, milled, 200 mesh pass
*-14Ac group 2.0 wt. % product, milled, 200 mesh pass

TABLE 3

| | Coating composition (wt %) | | | | | | | | | |
|---|---|---|---|---|---|---|---|---|---|---|
| | Resin A | | Resin B | | Filler | | Adjusting agent for time limit dissolution-out | | DI | DII | Produc- |
| No. | Name of material | % | Name of material | % | Name of material | % | Name of material | % | (No. of days) | (No. of days) | tion Process |
| Example 22 | PE | 45 | Paraffin wax | 5 | Talc | 44 | *-15 Chitin | 6 | 41 | 93 | 1 |
| Example 23 | " | " | Paraffin wax | " | " | " | *-16 Chitosan | 6 | 46 | 87 | " |
| Example 24 | *-17PP | 40 | *-18PS-VK | 10 | *-19CaCO3 | 46 | *-20 Oxidized starch | 4 | 315 | 720 | " |
| Example 25 | " | " | *-21SBS | " | *-22 Sulfur | " | *-23 Phosphoric acid starch | " | 291 | 653 | " |
| Example 26 | " | " | " | " | *-24 SiO2 | " | *-25 α-starch | " | 246 | 613 | " |
| Example 27 | *-26 PE-VK | " | *-27 SIS | " | *-22 Sulfur | " | *-28 CMS | " | 270 | 623 | " |
| Example 28 | *-26 PE-VK | " | *-27 SIS | " | *-29 Iron Oxide | " | *-30 Hydroxy-ethyl starch | " | 46 | 77 | " |
| Example 29 | *-26 PE-VK | " | *-27 SIS | " | *-31 Titan oxide | " | *-30 Hydroxy-ethyl starch | " | 54 | 88 | " |
| Example 30 | *-1ECO | " | *-32RB | " | *-33 Diatomaceous earth | " | *-34 Cathionic starch | " | 42 | 63 | " |
| Example 31 | " | " | " | " | *-35Clay | " | *-34 Cathionic starch | " | 47 | 74 | " |
| Example 32 | " | " | " | " | *-36 Zeolite | " | *-34 Cathionic starch | " | 44 | 64 | " |

*-1same as in Table 1
*-15Reagent grade, milled, 200 mesh pass
*-16Reagent grade, milled, 200 mesh pass TABLE 3-continued

*-17 Copolymer with ethylene, ethylene content 3.5 wt. %
*-18 Styrene-ethyl vinyl ketone copolymer, carbonyl content 5.8 wt. %
*-19 Average particle diameter 5$\mu$
*-20 Amicoat #800, made by Matsutani Chemical Industry Co., Ltd., 200 mesh pass
*-21 Styrene-butadiene copolymer (styrene/butadiene = 17/83)
*-22 Reagent grade
*-23 Degree of substitution: 0.1, 200 mesh pass
*-24 Hydrous $SiO_2$ powder, average particle diameter 10$\mu$
*-25 Matsunorin CM made by Matsutani Chemical Industry Co., Ltd., 200 mesh pass
*-26 Ethylene.methyl vinyl ketone copolymer, CO content: 1.1 wt. %
*-27 Styrene.isoprene block copolymer (styrene/isoprene = 14/86)
*-28 Carboxymethyl starch Degree of substitution: 0.17, 200 mesh pass
*-29 Reagent grade
*-30 Degree of substitution: 0.05, 200 mesh pass
*-31 $TiO_2$, Average particle diameter 0.5$\mu$
*-32 Syndiotactic 1,2-polybutadiene, density: 0.901, MFI: 3
*-33 Average particle diameter 5$\mu$
*-34 Degree of substitution: 0.01, 200 mesh pass
*-35 Average particle diameter 5$\mu$
*-36 Average particle diameter 5$\mu$

TABLE 4

| | Coating composition (wt %) | | | | | | | | DI | DII | Production Process |
|---|---|---|---|---|---|---|---|---|---|---|---|
| | Resin A | | Resin B | | Filler | | Adjusting agent for time limit dissolution-out | | | | |
| No. | Name of material | % | Name of material | % | Name of material | % | Name of material | % | (No. of days) | (No. of days) | |
| Example 33 | *-5 PVdCL | 55 | — | — | *-Talc | 39 | *-37 Starch (water content: 12%) | 6 | 201 | 371 | 2 |
| Example 34 | " | " | — | — | " | 37 | *-37 Starch (water content: 12%) | 8 | 203 | 247 | " |
| Example 35 | " | " | — | — | " | 31 | *-37 Starch (water content: 12%) | 14 | 194 | 260 | " |
| Example 36 | " | " | — | — | " | 27 | *-37 Starch (water content: 12%) | 18 | 189 | 236 | " |
| Example 37 | " | " | — | — | " | 31 | *-38 Starch (water content: 30%) | 14 | 233 | 290 | " |
| Example 38 | " | " | — | — | " | 27 | *-38 Starch (water content: 30%) | 18 | 235 | 287 | " |
| Example 39 | " | " | — | — | " | 39 | *-39 Starch (water content: 0.1%) | 6 | 145 | 124 | " |
| Example 40 | " | " | — | — | " | 37 | *-39 Starch (water content: 0.1%) | 8 | 143 | 70 | " |
| Example 41 | " | " | — | — | " | 31 | *-39 Starch (water content: 0.1%) | 14 | 131 | 48 | " |

TABLE 4-continued

| | Coating composition (wt %) | | | | | | | | | |
|---|---|---|---|---|---|---|---|---|---|---|
| | Resin A | | Resin B | | Filler | | Adjusting agent for time limit dissolution-out | | $D_I$ | $D_{II}$ | Produc- |
| No. | Name of material | % | Name of material | % | Name of material | % | Name of material | % | (No. of days) | (No. of days) | tion Process |
| Example 42 | " | " | — | — | " | 27 | *-39 Starch (water content: 0.1%) | 18 | 128 | 29 | " |

*-2Same as in Table 1
*-5Same as in Table 2
*-37Corn starch subjected to water absorption up to 12% according to isothermal water absorption curve of corn starch
*-38Corn starch subjected to water absorption up to 30% according to isothermal water absorption curve of corn starch
*-39Corn starch dried up to a water content of 0.1%

IV Results of production and measurement

In Examples and Comparative examples in Tables 1 to 3, the induction period ($D_1$) and the duration ($D_2$) of dissolution-out of products produced in Production example 1 were measured.

In Comparative example 1, a product obtained by coating with a $C_2 H_4$—CO copolymer having talc as a filler added therein was used. In this case, dissolution-out was inhibited over a long period. Namely, even after lapse of 100 days, the days do not reach $D_1$ as 10% dissolution-out days.

Examples 1 to 5 are directed to examples wherein a part of talc in Comparative example 1 was replaced by wheat flour. In the case of the Examples, as the addition quantity increases, $D_1$ and $D_2$ decrease and evidently, the dissolution-out velocity of the time limit dissolution-out type comes to be exhibited. Examples 6 to 9 illustrate changes in $D_1$ and $D_2$ in the case where the proportions of the resin and the filler were varied, while the percentage of wheat flour was kept constant. Examples 10 and 11 illustrate changes in $D_1$ and $D_2$ in the case where the proportions of the filler and wheat flour and the total quantity of the resins are kept constant, but the resins are blended and the proportions thereof are changed, and when the filler increases relative to the $C_2 H_4$—C copolymer constituting the fundamental resin in these Examples, or the proportion of the $C_2 H_4$—CO copolymer increases, then $D_1$ and $D_2$ decrease.

However, as compared with the case where wheat flour is added, $D_1/D_2$ ratio decreases; this shows that it is possible to separately control $D_1$ and $D_2$ by adequately selecting the coating composition. Similarly, even grain flour such as rice flour, etc. besides wheat flour afforded similar results.

Comparative example 2 is directed to a coated urea consisting of polyvinylidene chloride resin and talc, and dissolution-out is restricted over a long period as in the case of Comparative example 1. However, when a part of talc is replaced by corn starch, dissolution-out of a time limit dissolution-out type is exhibited and it has been possible to restrict $D_1$ and $D_2$ depending upon the addition quantity, as in the cases of Examples 1 to 5. In the case of the combinations, a product having a particularly long $D_1$ was obtained.

Comparative example 3 is directed to a coated urea composed of a coating of a low density polyethylene and talc, and its dissolution-out has been restricted over a long period, whereas when powder such as agar powder, alginic acid PG powder or the like, is dispersed, a product of a time limit dissolution-out type is obtained in any of the cases.

When these additives and a coating composition are combined, it is possible to control $D_1$ and $D_2$.

Examples 24 to 27 are directed to coated potassium nitrate wherein talc is replaced by $CaCO_3$, S or $SiO_2$, and oxidized starch, phosphoric acid starch, a-starch or carboxymethyl starch is used as the time limit dissolution-out controlling agent. Only in this case, the percentage of capsulation was made 7.5%. This case, too, shows that the time limit dissolution-out control can be effected.

Examples 28 to 32 are directed to coated urea wherein a metal oxide, diatomaceous earth, clay or zeolite was used as the filler and hydroxyethyl starch or cathionic starch was dispersed as the time limit dissolution-out controlling agent. These additives, too, are useful materials for the present invention.

Examples in Table 4 are directed to cases wherein products were prepared in Production example 2 and the respective dissolution-out periods of $D_1$ and $D_2$ were measured.

Examples 33 to 36 are directed to coated urea coated with polyvinylidene chloride having dispersed therein, talc as a filler and corn starch having adjusted its water content to 12% by weight, as a time limit dissolution-out controlling agent. For the present, although the dissolution-out velocity of the time limit dissolution-out type is shown, even when the quantity of the agent for the time limit dissolution-out added was increased, there was observed no regular reduction in $D_1$ and $D_2$ as shown in Examples 12 to 15 using products prepared in Production example 1.

Further, $D_1$ and $D_2$ become both a long period; hence it can be said that the time limit dissolution-out effect is small. In such a situation, it is difficult to optionally control $D_1$ and $D_2$.

Examples 37 and 38 are directed to coated urea using corn starch having adjusted its water content to 30 wt. %. $D_1$ and $D_2$ became further longer.

The water content of corn starch in the above Examples 33 to 38 was adjusted by allowing the corn starch to stand for 48 hours under a relative humidity environment affording the aimed water absorption quantity according to the isothermic, water absorption curve of the corn starch.

Examples 39 to 42 are directed to coated urea using a dried corn starch product (water content: 0.1 wt. %, dried at 50° C. for 72 hours) as the dissolution-out-controlling agent. The addition effect of the dried product was almost the same as that in the case of Production example 1 of dispersion-in-solution type.

What we claim is:

1. A granular fertilizer composition coated with a resin layer, said resin layer comprising a resin component and particles of a sugar polymer or a sugar polymer derivative, said particles having a particle diameter in the range of 0.1 to 100 μm, and said particles being contained in said resin in a quantity of 0.5 to 20% by weight based upon the weight of the resin layer, wherein said resin layer suppresses dissolution-out of the fertilizer from the composition over a predetermined period of time.

2. A granular fertilizer composition according to claim 1 wherein said sugar polymer or its derivative comprises at least one member selected from the group consisting of grain flour, cellulose powder, powder of chitin, chitosan and derivatives thereof, agar powder, alginic acid powder, starch and its derivatives.

3. A granular fertilizer composition according to claim 2, wherein said grain flour is at least one member selected from the group consisting of rice flour, wheat flour, barley flour, oat flour and corn flour.

4. A granular fertilizer composition according to claim 2, wherein said cellulose powder comprises at least one derivative thereof selected from the group consisting of methyl cellulose, ethyl cellulose, carboxymethyl cellulose and carboxyethyl cellulose.

5. A granular fertilizer composition according to claim 2, wherein the starch derivative is at least one member selected from the group consisting of oxidized starch, fatty acid ester starch, alkyl ether starch, hydroxyalkyl ether starch and mineral acid ester starch.

6. A granular fertilizer composition according to claim 1, wherein said polymer comprises a powder containing a sugar polymer or its derivative dispersed in a resin coating comprising as an active ingredient at least one member selected from the group consisting of an olefin polymer, an olefin copolymer, vinylidene chloride polymer, and a vinylidene chloride copolymer.

7. A granular fertilizer composition according to claim 6, wherein said copolymer of vinyulidene chloride comprises at least one member selected from the group consisting of ethylene, propylene and butene, and at least one member selected from the group consisting of ethylene-CO copolymer, ethylenevinyl ketone copolymer, vinylidene chloride-vinyl chloride copolymer and vinylidene-acrylatecopolymer.

8. A granular fertilizer composition according to claim 1, wherein said resin layer comprises a resin component a mineral filler, and particles comprising a sugar polymer or its derivative dispersed in said resin.

9. A granular fertilizer composition according to claim 8, wherein said mineral filler is at least one member selected from the group consisting of powder of talc, sulfur, $CaCO_3$, silica, zeolite, diatomaceous earth, clay and metal oxides.

10. A granular fertilizer composition according to claim 8, wherein the amount of said mineral filler is 20 to 70 weight % based upon the weight of said resin.

11. A granular fertilizer composition according to claim 1 wherein said sugar polymer or derivative is dispersed in said resin.

12. A granular fertilizer composition according to claim 11 wherein said sugar polymer or its derivative is dispersed in said resin which also contains a mineral filler.

13. A granular fertilizer composition according to claim 12 wherein said mineral filler is present in said resin in the amount of 20 to 70 weight % based on the weight of said resin.

14. A granular fertilizer composition according to claim 1 wherein the resin layer is present in sufficient thickness such that the period from its application until 10% dissolution-out is 26 to 315 days.

15. A granular fertilizer composition according to claim 1 wherein said resin layer is present in sufficient thickness such that the period from 10% dissolution-out until completion of its dissolution-out is 29 to 371 days.

* * * * *